(12) United States Patent
Weiss (10) Patent No.: US 6,641,344 B2
(45) Date of Patent: Nov. 4, 2003

(54) ANCHOR DEVICE FOR A WALL PANEL (76) Inventor: Robert W. Weiss, 104 N. St. Mary Avenue, Albert Lea, MN (US) 56007

( * ) Notice: Subject to any disclaimer, the term of this patent is extended or adjusted under 35 U.S.C. 154(b) by 0 days.

(21) Appl. No.: 10/084,577

(22) Filed: Feb. 27, 2002

(65) Prior Publication Data

US 2003/0161703 A1 Aug. 28, 2003

(51) Int. Cl.$^7$ .............................. F16B 15/00; F16B 15/08
(52) U.S. Cl. ..................... 411/450; 411/451.2; 411/485; 411/499
(58) Field of Search .............................. 411/450, 451.2, 411/480, 483, 485, 499

(56) References Cited

U.S. PATENT DOCUMENTS

| 2,789,783 | A | * | 4/1957 | Jones |
| 4,021,990 | A | | 5/1977 | Schwalberg ................. 52/714 |
| 4,509,713 | A | * | 4/1985 | Hogg .......................... 411/450 |
| 4,886,405 | A | | 12/1989 | Blomberg .................... 411/16 |
| 5,037,257 | A | | 8/1991 | Kubic et al. ................. 411/30 |
| 5,944,294 | A | | 8/1999 | Baer ..................... 248/220.43 |

* cited by examiner

Primary Examiner—Neill Wilson
(74) Attorney, Agent, or Firm—Westman, Champlin & Kelly, P.A.

(57) ABSTRACT

An anchor device for securing a fixture to a panel having an elongate body including a curvilinear extent and a distal end. The device includes a fixture portion coupled to and extending from the elongate body and spaced from the distal end of the device to anchor the fixture portion to the panel.

15 Claims, 7 Drawing Sheets

ANCHOR DEVICE FOR A WALL PANEL

BACKGROUND OF THE INVENTION

The present invention relates to a fixture anchor for a wall. In particular, the present invention relates to an anchor device having particular application for securing or mounting a fixture or article on a relatively thin panel or section, such as drywall or sheetrock.

Walls or partitions are typically constructed of thin panels or sections which are secured to or connected between spaced studs or frame members, including for example foamboard, laminate or drywall. The thin wall construction or size of the panels or sections can make it difficult to secure or hang articles or fixtures on an intermediate space between spaced studs or frame members.

For example conventional fasteners are useful to secure articles or fixtures to the wall at the studs or frame members but not as useful for securing or mounting fixtures or articles to a wall panel itself. Fasteners designed specifically for hanging or mounting fixtures or articles to wall panels or sections can be difficult to remove once inserted or can require tools to insert and/or remove the fastener. The present invention addresses these and other problems and provides advantages not recognized nor appreciated by the prior art.

SUMMARY OF THE INVENTION

The present invention relates to an anchor device for securing a fixture to a panel. The anchor device includes an elongate body having a curvilinear extent. The device includes a fixture portion coupled to and extending from the elongate body and spaced from a distal end of the device to anchor the fixture portion to the panel. Other features and benefits that characterize embodiments of the present invention will be apparent upon reading the following detailed description and review of the associated drawings.

BRIEF DESCRIPTION OF THE DRAWINGS

FIGS. 4-1 and 4-2 progressively illustrate installation of an embodiment of an anchor device of the present invention.

DETAILED DESCRIPTION OF THE PREFERRED EMBODIMENTS

Figure 1:
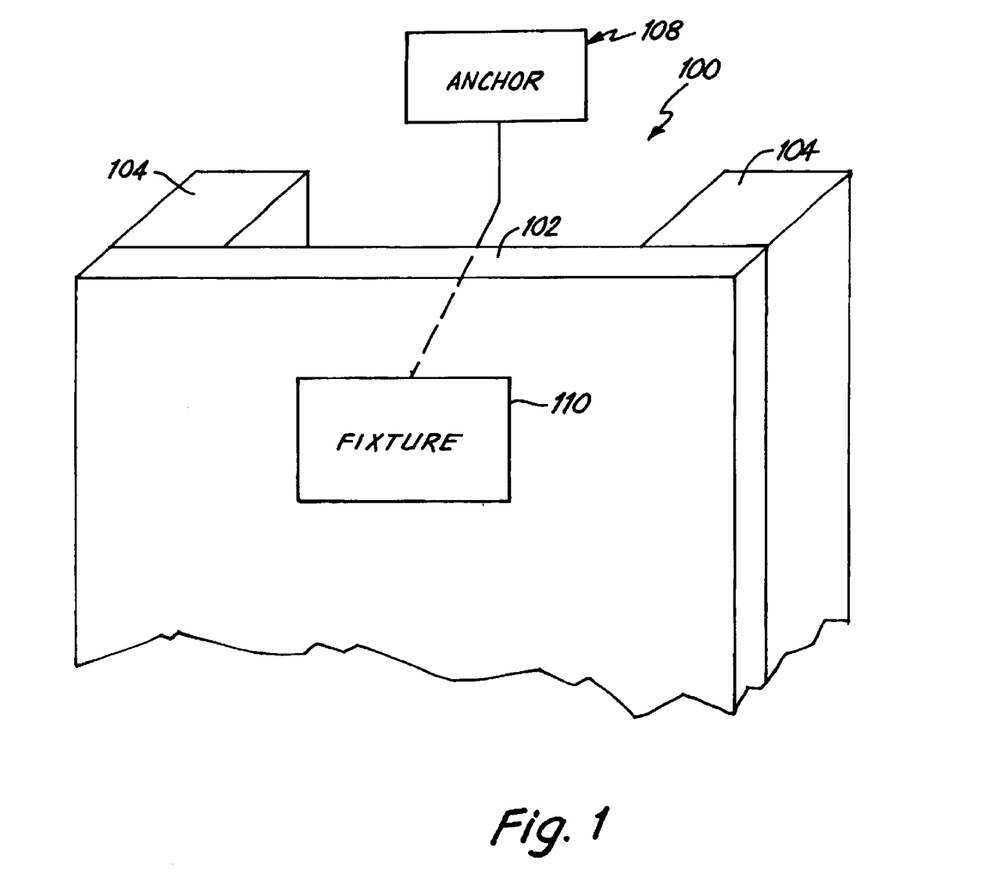
FIG. 1 is a schematic illustration of an anchor device to secure a fixture to a wall or panel.

FIG. 1 schematically illustrates a wall or partition 100 constructed of a thin panel or section 102 (for example, drywall, laminate or foam panel etc.) supported between spaced frame members or studs 104. As schematically illustrated in FIG. 1, the present invention provides an anchor device 108 illustrated schematically to hang or mount a fixture or article 110 on the wall or panel 102 as schematically shown.

Figure 2:
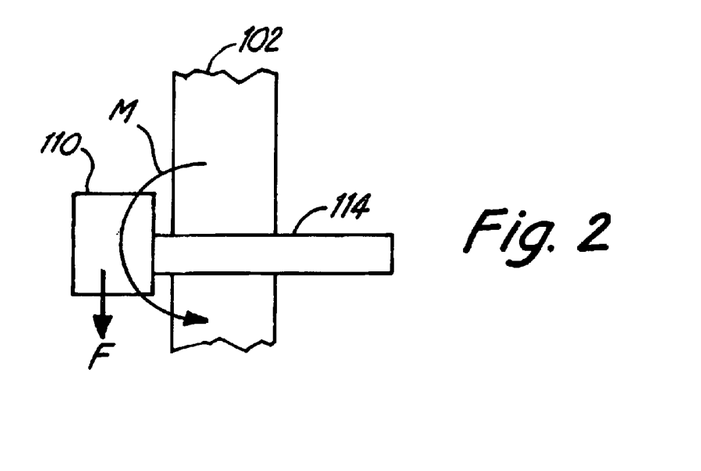
FIG. 2 is a schematic side view illustration of a conventional fastener to secure a fixture to a wall.

The anchor device of the present invention provides an elongate anchor portion and end portion to counteract the force and moment of a fixture to hang or mount the fixture to the wall or panel. In particular as schematically illustrated in FIG. 2, fixture 110 supplies a force F and moment M which must be countered or balanced to mount or secure the fixture to the wall or panel. The thickness of the panel 102 limits the reactive force or holding capacity of conventional fasteners.

Figure 3:
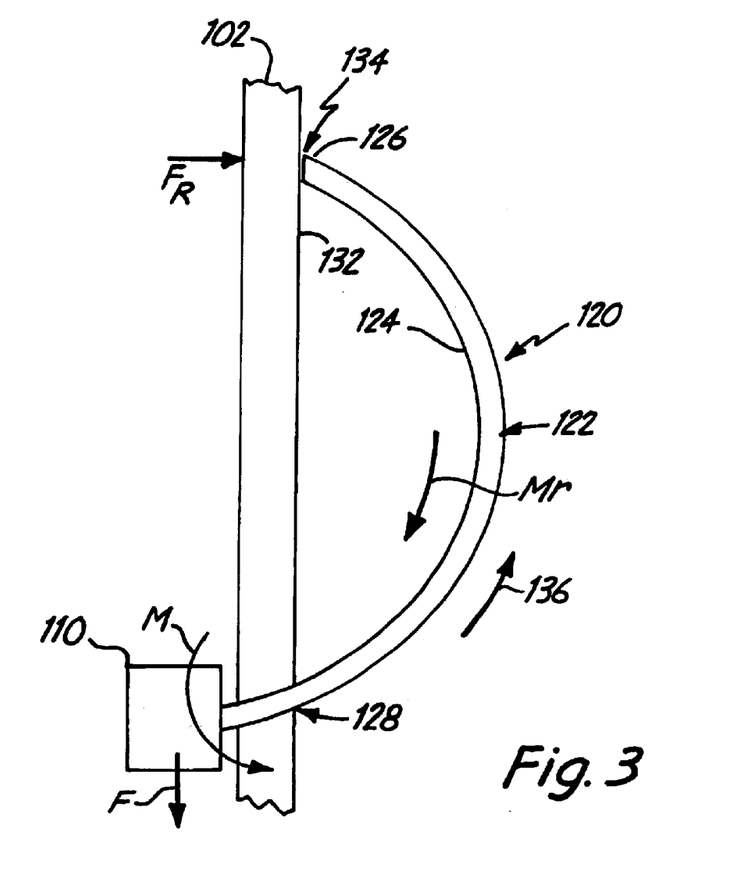
FIG. 3 is a schematic side view illustration of an embodiment of an anchor device of the present invention.

FIG. 3 illustrates an embodiment of an anchor of the present invention having an anchor portion 120 to secure the fixture 110 to the panel 102. As shown the anchor portion 120 includes an elongate body 122 having a curvilinear portion or extent 124 which extends to a distal end or portion 126. As shown, for use the elongate body 122 of the anchor device 108 extends through panel 102 at a first anchor position 128.

The curvilinear portion 124 extends therefrom behind the panel 102 so that the distal end 126 contacts or abuts surface 132 of the panel at a second anchor position 134 spaced from the first anchor position 128. As described, the anchor portion 120 provides sufficient reactive force to support a fixture anchored thereby. In particular, engagement of the distal end 126 against panel 102 provides a reactive force $F_r$ or $M_r$ to counteract the fixture moment M to anchor the fixture along the panel 102 without alignment with a stud or frame member 104.

Figure 41:
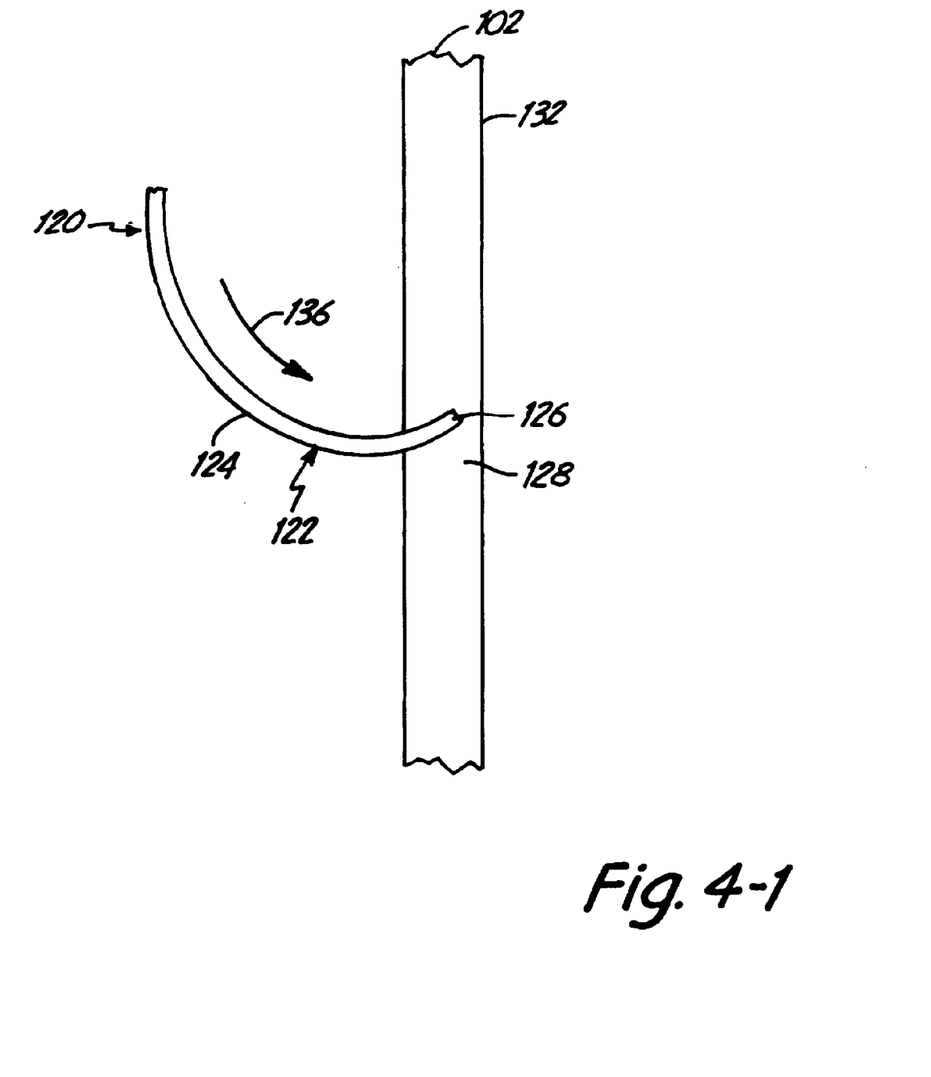
Figure 42:
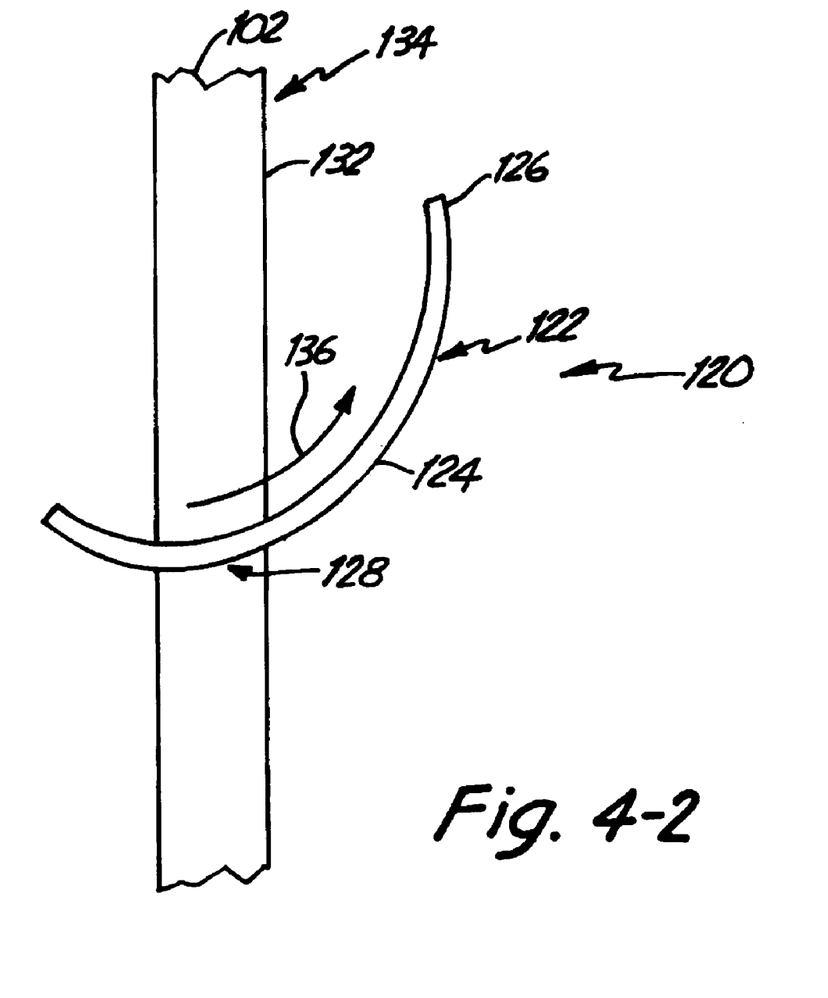

The anchor portion 120 is installed for use as progressively illustrated in FIGS. 4-1 and 4-2. As shown, the distal end 126 is inserted through the panel 102 at the first anchor position 128. Thereafter the distal end 126 is advanced through the thickness of the panel 102 as shown. The anchor is further inserted while rotating the anchor portion 120 as illustrated by arrow 136. The anchor is inserted and rotated until the distal end 126 abuts or contacts the surface 132 of the panel 102 at the second anchor position 134 spaced from the first anchor position 128 to install the anchor for use. As described, the anchor is formed of a material having sufficient rigidity and pushability to insert and rotate the anchor to install the anchor for use. For example, the anchor can be fabricated from a metal or rigid plastic material, composite structure or other materials.

For removal, the anchor is rotated in the reverse direction from arrow 136 to withdraw the distal end 126 from the panel 102 to remove the anchor following use. Thus, the anchor provides a reactive moment and force to hang a fixture on the panel 102 which can be removed following use without multiple tools or accessories. Once removed the anchor device can be reused for a subsequent application or installed at a new or different location.

Figure 5:
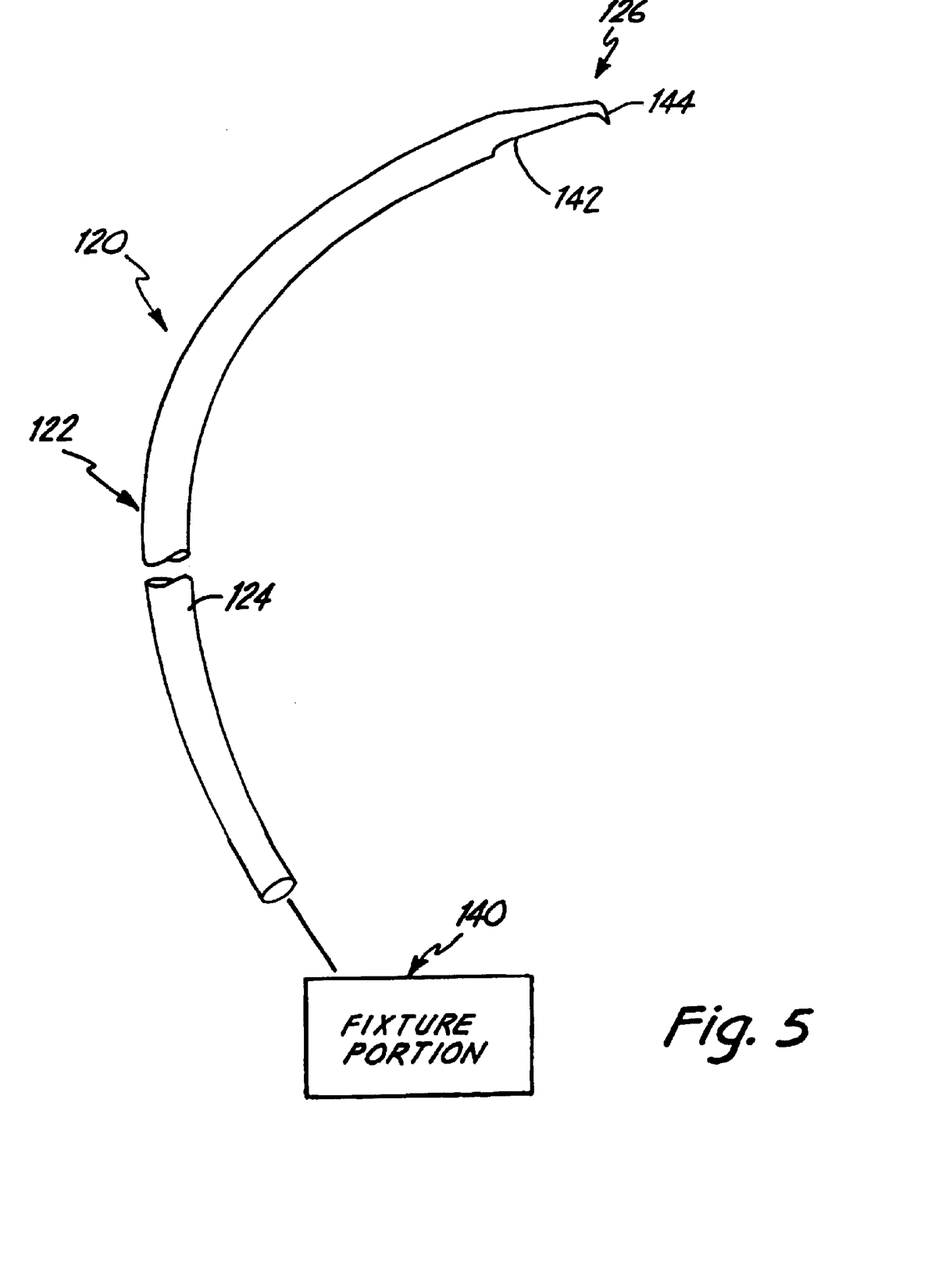
FIG. 5 schematically illustrates a side view of an embodiment of an anchor device including a tapered distal tip having a claw extending therefrom.

FIG. 5 schematically illustrates an embodiment of an anchor device where like numbers are used to refer to like parts in the previous FIGS. In the embodiment illustrated in FIG. 5, the elongate body 122 is formed of a solid cylindrical structure having a curvilinear portion or extent. The curvilinear portion is shaped to allow for insertion and rotation of the anchor to abut the distal end 126 at the second anchor position for use as previously described. As shown, the anchor includes a fixture portion 140 illustrated schematically extending from the elongate body 122 and spaced from the distal end 126 which is secured to the panel or wall by the anchor portion 120 of the device.

As previously described, the distal end 126 is inserted through the panel for installation. The distal end 126 can be inserted through a pre-made opening in the panel or wall to install the anchor. In the embodiment illustrated in FIG. 5, the distal end 126 is tapered along a portion thereof to form a tapered distal tip 142 to pierce through the panel or wall to install the anchor for use. As described, the anchor is advanced and rotated for installation so that the fixture portion 140 abuts an exterior wall or panel surface at the first anchor position 128 and the distal end 126 abuts the surface 132 at the second anchor position 134. In the embodiment illustrated in FIG. 5, the distal tip 142 includes a claw 144 angled relative to the distal tip 142 and shaped to engage the panel or wall to secure the fixture portion 140 for use.

Figure 6:
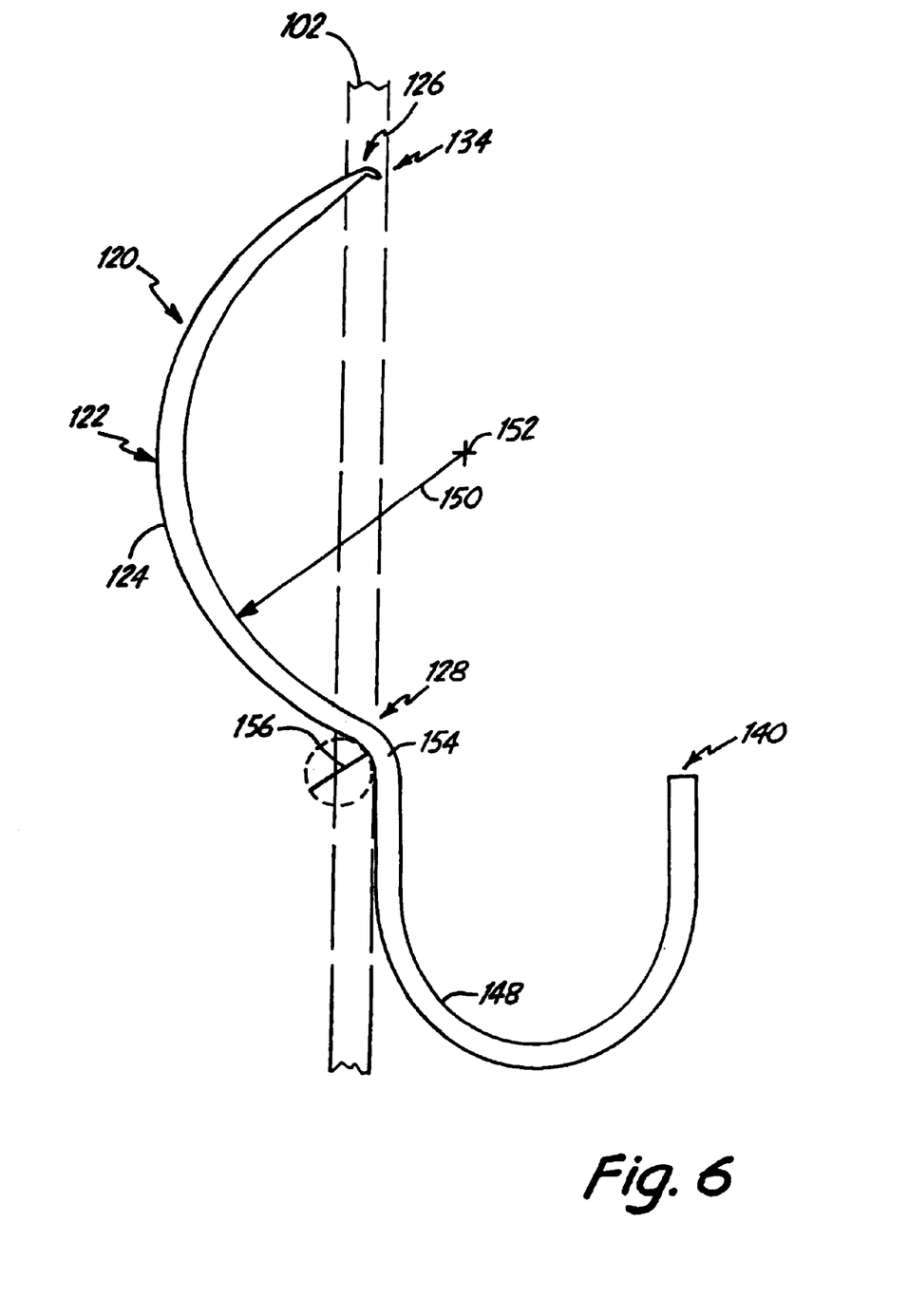
FIG. 6 is a side view illustration of an embodiment of an anchor device having a hook.

FIG. 6 schematically illustrates an embodiment of an anchor device where like numbers are used to refer to like parts in the previous FIGS. As shown, fixture portion 140 of the illustrated embodiment includes a hook 148 that is integrally coupled to the elongate body 122 and spaced from the distal end 126. Hook 148 is secured to panel 102 by the anchor portion 120 to hang various objects or articles such as towels, coats, keys etc.

As illustrated in detail, anchor portion 120 of the embodiment illustrated in FIG. 6 is formed of a circular portion having an arc having a uniform radius 150 from center point 152 to form the curvilinear extent or portion 124 which extends from the fixture portion 140 to the distal end 126. The curvilinear extent or portion is shaped to provide a desired curvature for insertion and withdrawal. In the illustrated embodiment, the anchor is formed of a $^3/_{16}$" diameter steel material having a radius dimension 150 of 2 and $^1/_8$" inches, although application is not limited to a steel material. For example, the device can be formed of a unitary molded plastic structure to form a single integral construction.

In the illustrated embodiment, the hook 148 is formed integral with the elongate body 122 of the anchor portion and the anchor includes a transition curvature 154 or bend at a transition from the anchor portion to the hook 148. In the illustrated embodiment, the transition curvature or bend has a ½" diameter curvature as illustrated by line 156. The transition curvature 154 provides a desired curvature or bend to limit elongation of the anchor opening through the panel and to restrict movement or withdraw of the anchor.

Figure 7:
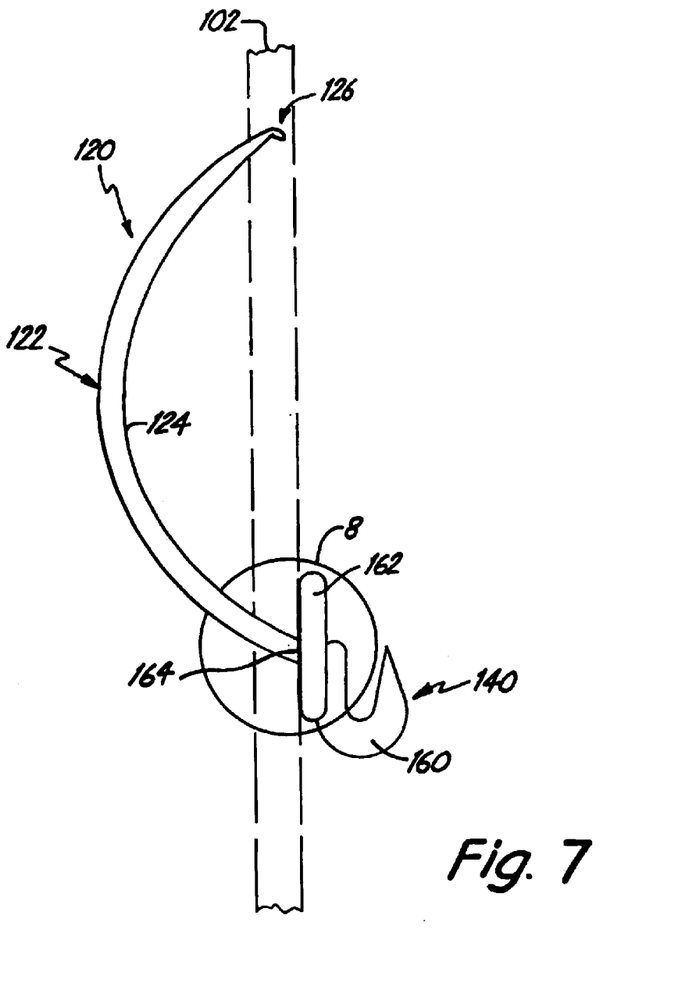
FIG. 7 is a side view illustration of an embodiment of an anchor device including an integral anchor cap and hook.
Figure 8:
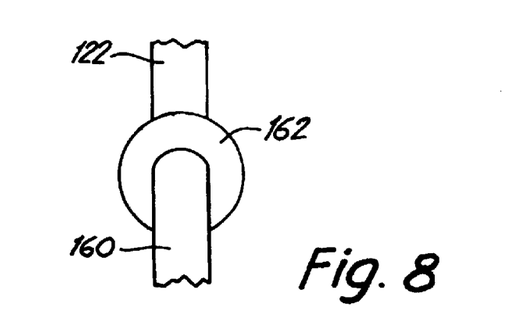
FIG. 8 is a front elevational view of a detailed portion 8 of FIG. 7.

FIGS. 7–8 illustrate another embodiment of an anchor where like numbers are used to refer to like parts in the previous FIGS. In the embodiment illustrated in FIGS. 7–8, the fixture portion 140 includes a hook 160 shaped to hang pictures or decorative articles. The anchor also includes an anchor cap 162 which is used to hide the opening formed in the panel or wall through which the anchor device is inserted and installed.

In the illustrated embodiment, the anchor cap 162 is formed of a plate like structure which in one embodiment can be integrally molded with the structure of the anchor device at an interface 164 between the anchor portion 120 and the fixture portion 140 to cover the insertion opening. The anchor device can be formed of a decorative plastic molded construction and can be available in multiple decorative colors or styles for various applications.

Thus, as described, the anchor of the present invention can be inserted and rotated for installation and can be removed without multiple tools or accessories by rotating and withdrawing the anchor portion from the wall or panel. The fixture portion of the device can include various fixture components or devices such as, adhesive fasteners, clips, shelves, dowels holders, or other functional or decorative articles and application of the present invention is not limited to the particular fixture portions shown.

Although the present invention has been described with reference to preferred embodiments, workers skilled in the art will recognize that changes may be made in form and detail without departing from the spirit and scope of the invention.

What is claimed is:

1. An anchor device for securing a fixture comprising:
   an anchor portion including an elongate body extending to a distal end and the elongate body having a curvilinear extent extending along a length thereof to form a main body portion and an anchoring claw formed along a distal portion of the elongated body and the anchoring claw including a tapered claw tip extending at an angle from the main body portion to engage a wall panel; and
   fixture portion spaced from the distal end and coupled to and extending from the anchor portion.

2. The device of claim 1 wherein the fixture portion includes a hook.

3. The device of claim 1 wherein the curvilinear extent has a constant curvature radius from a common center point.

4. The device of claim 1 wherein the anchor device is formed of a unitary molded plastic.

5. The device of claim 1 wherein the elongate body of the anchor portion is a cylindrical structure.

6. The device of claim 1 including a metal anchor portion.

7. The device of claim 1 and further comprising an anchor cap spaced from the distal end at an interface between the anchor portion and the fixture portion.

8. The anchor device of claim 1 wherein the curvilinear extent extends from the fixture portion to the distal end.

9. The device of claim 7 wherein the anchor cap includes a "plate-like" portion at the interface between the anchor portion and the fixture portion.

10. The device of claim 7 wherein the anchor device is formed from a molded structure and the anchor cap is molded therewith to form an integral molded structure.

11. An anchor device comprising:
    an anchor portion including an elongate body having a curvilinear extent and an anchoring claw including a tapered claw tip extending at an angle relative to the curvilinear extent and the elongate body being shaped for insertion through a panel at a first anchor position and rotatable to position the anchoring claw of the anchor portion at a second anchor position spaced from the first anchor position and to engage the tapered claw tip with the panel at the second anchor position; and
    a fixture portion coupled to the anchor portion.

12. A method for securing a fixture to a panel comprising steps of:
    inserting a distal end of an anchor device having an elongate extent extending therefrom through the panel at a first anchor position;
    advancing the elongate extent through the panel and rotating the anchor device to position an anchoring claw of the anchor device at a second anchor position spaced from the first anchor position; and engaging the panel at the second anchor position with an angled claw tip of the anchoring claw to secure the fixture.

13. The method of claim 12 wherein the step of inserting the distal end comprises the step of;

piercing through the panel with the distal end of the anchor device to form an opening therethrough to insert the anchor device.

14. The method of claim 12 wherein the step of inserting the distal end comprises the steps of:

forming an opening through the panel; and inserting the distal end and the elongate extent of the anchor device therethrough.

15. The method of claim 12 and further comprising the step of:

rotating the anchor device and withdrawing the anchor device to remove the anchor device from the panel.

\* \* \* \* \*

UNITED STATES PATENT AND TRADEMARK OFFICE
CERTIFICATE OF CORRECTION

PATENT NO. : 6,641,344 B2
DATED : November 4, 2003
INVENTOR(S) : Weiss

It is certified that error appears in the above-identified patent and that said Letters Patent is hereby corrected as shown below:

<u>Column 4,</u>
Line 22, insert -- a -- before "fixture".

Signed and Sealed this

Second Day of November, 2004

JON W. DUDAS
*Director of the United States Patent and Trademark Office*